United States Patent [19]
Colvin, Sr.

[11] Patent Number: 5,825,881
[45] Date of Patent: Oct. 20, 1998

[54] PUBLIC NETWORK MERCHANDISING SYSTEM

[75] Inventor: Bryan Colvin, Sr., San Jose, Calif.

[73] Assignee: Allsoft Distributing Inc., San Jose, Calif.

[21] Appl. No.: 671,734

[22] Filed: Jun. 28, 1996

[51] Int. Cl.6 .................................................. H04L 9/00
[52] U.S. Cl. .................. 380/24; 380/9; 380/23; 380/25; 380/49; 705/26
[58] Field of Search ............................. 380/4, 9, 21, 23, 380/24, 25, 49, 50, 59; 395/226, 227; 705/26, 27, 35, 38, 39, 40, 42, 44

[56] References Cited

U.S. PATENT DOCUMENTS

| | | |
|---|---|---|
| 4,203,166 | 5/1980 | Ehrsam et al. . |
| 4,484,025 | 11/1984 | Ostermann et al. . |
| 4,578,530 | 3/1986 | Zeidler ........................................ 380/24 |
| 5,444,780 | 8/1995 | Hartman, Jr. .............................. 380/30 |
| 5,600,722 | 2/1997 | Yamaguchi et al. ........................ 380/21 |
| 5,604,807 | 2/1997 | Yamaguchi et al. ........................ 380/48 |
| 5,657,390 | 8/1997 | Elgamal et al. ............................ 380/49 |
| 5,661,803 | 8/1997 | Cordery et al. ............................ 380/21 |

OTHER PUBLICATIONS

Marvin A. Sirbu, "Internet Billing Service Design and Prototype Implementation"; IMA Intellectual Property Project Proceedings, (vol. 1, issue 1, pp. 67–79;Jan. 1994).

Brian Santo, "Bill–paying Put On–line"; Electronic Engineering Times (n840, p. 82; Mar. 20, 1995).

"The NetBill Electronic Commerce Project"; Carnegie Mellon University; May 15, 1995.

*Primary Examiner*—Bernarr E. Gregory
*Attorney, Agent, or Firm*—McCutchen, Doyle Brown & Enersen, LLP

[57] ABSTRACT

A system for conducting commerce over a large public network such as the Internet. The system facilitates communications between a merchant, a customer, and a bank or credit card processor.

13 Claims, 1 Drawing Sheet

PUBLIC NETWORK MERCHANDISING SYSTEM

FIELD OF THE INVENTION

The present invention relates to digital commerce and, more particularly, to digital commerce conducted over a public network.

BACKGROUND OF THE INVENTION

The Internet is expected to become the world's new market place. The number of people who have access to the Internet is growing rapidly. Merchants are increasingly interested in selling products and services over the Internet, particularly via the World Wide Web.

There are, however, several problems with conducting commerce over a public network such as the Internet. One problem is the lack of a secure means for transferring information and money. When making a purchase, a customer generally must transmit his credit card number and other confidential information electronically to the merchant. Such information is at risk of interception by third parties or misuse by employees of the merchant. Although some Web browsers permit data encryption, the effectiveness of such encryption generally is limited.

Another problem with commerce over the Internet is that the customer generally must type in and transmit a plethora of information, including confidential financial information, each time the customer wishes to purchase something from a merchant. The type and form of such information varies from merchant to merchant, and each merchant typically has a customized electronic order form. This is a hassle for the customer. It also requires confidential information to be placed at risk each time such information is transmitted to a new merchant.

Another problem with commerce over the Internet is the lack of standards and integration for conducting digital commerce. Creating a "virtual store" often is expensive and time consuming because merchants must create custom systems for selling their merchandise and making sure they obtain adequate information and payment from customers.

Accordingly, there is a need to reduce disadvantages associated with conducting digital commerce over a public network.

SUMMARY OF THE INVENTION

The present invention provides for an improved merchandising system. A merchandising system according to the present invention is particularly useful in connection with commerce conducted over a large public network, such as the Internet.

A wide variety of embodiments of the present invention exist. In a preferred embodiment, the invention is implemented as follows. Each transaction involves a merchant, a customer and a financial institution, such as a bank or other money processor. Each merchant, customer and financial institution that may participate in transactions has its own encryption key, which is kept confidential. A copy of each such key also exists in a central, secure database system. Each customer preferably is given a free "Internet Consumer kit," available at each participating merchant, which includes software for conducting transactions with merchants. Each merchant uses an integrated communications software package that includes a database, a customer interface, a financial institution interface, and a virtual HTML store generator. The customer selects products to purchase by accessing a merchant's Web site and clicking on one or more "links" that puts the products in a "virtual shopping cart." The customer then clicks a "checkout link" that causes an itemized price list to be downloaded to the customer's computer. Once downloaded, this information is merged with information locally stored on the customer's computer. The customer's computer then adds sales tax information and sends this information along with a shipping address back to the merchant. Credit card information from the customer is sent directly to the financial institution; the merchant never receives the customer's credit card information. The financial institution informs the merchant that the transaction is complete. The above-described preferred embodiment is only one of many embodiments of the present invention.

The present invention offers many advantages over the prior art. Advantages associated with one or more embodiments of the present invention include, without limitation, the advantages enumerated below.

The amount of confidential information sent to merchants is limited, reducing the risk that such information will be intercepted or misused.

The customer need not type in a large amount of information each time a transaction is conducted. In many embodiments of the present invention, rather than typing personal information into a merchant form, the customer simply transfers this information from his local database using a limited number of predetermined keystrokes. This method is much preferred because such personal information rarely changes. When such information does change, the customer need only update his database once.

It is also relatively easy for merchants to establish a virtual store, because the present invention provides a standardized way to obtain the necessary information and payment from customers.

Additional advantages of the present invention are described below and/or will become apparent to those skilled in the art based on the present disclosure.

BRIEF DESCRIPTION OF THE DRAWING(S)

A complete understanding of the present invention may be gained by considering the following detailed description in conjunction with the accompanying drawing, in which:

FIG. 1 is a block diagram of a merchandising system according to the present invention.

DETAILED DESCRIPTION OF PREFERRED EMBODIMENT(S)

Figure 1:
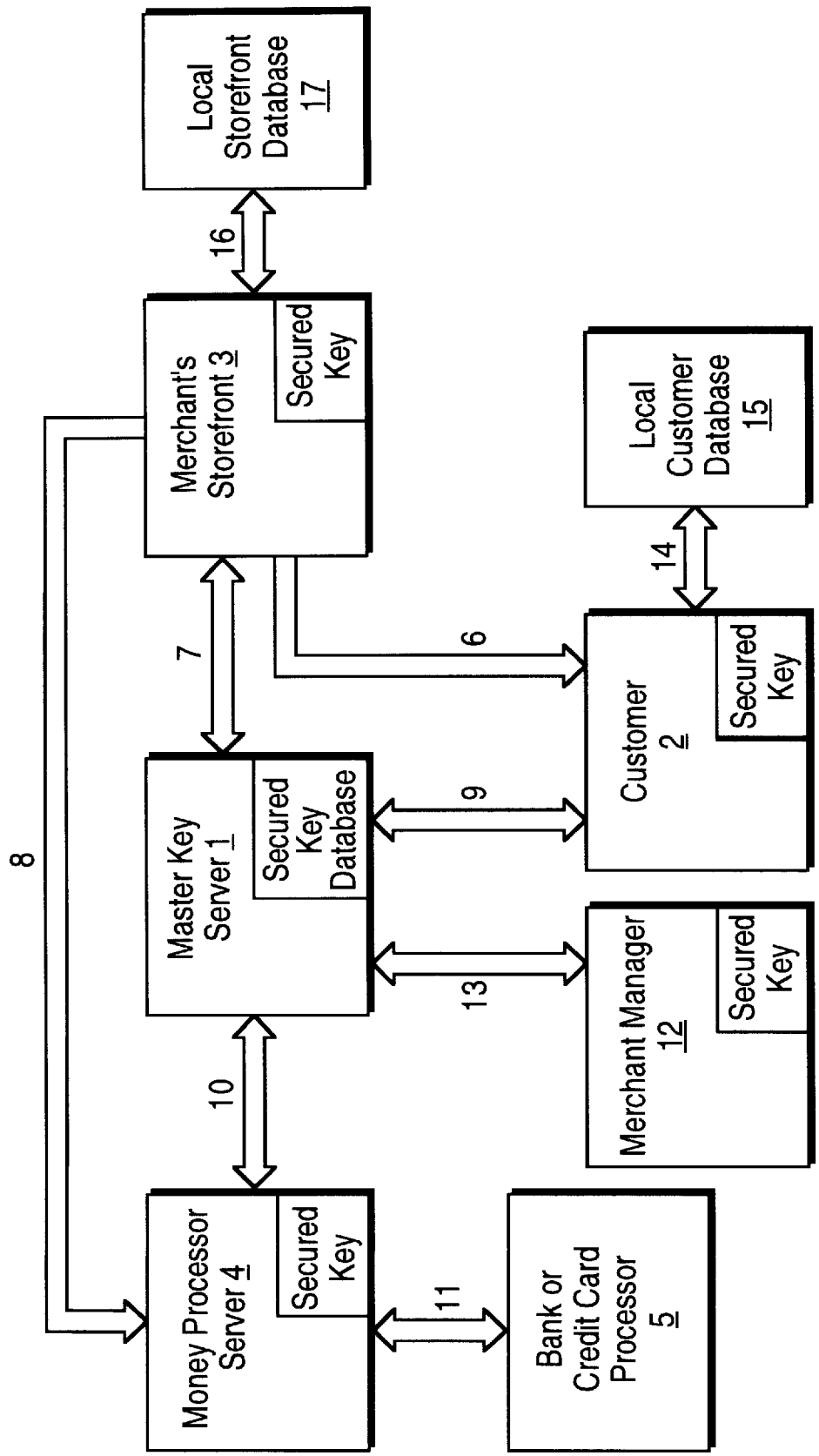

In a preferred embodiment of a merchandising system according to the present invention, transactions are conducted over a large public network, such as the Internet. Each transaction involves a merchant, a customer, and a money processor that each use computer systems connected to the network.

Each merchant, customer and money processor that may participate in transactions has its own encryption key. This encryption key is referred to herein as a secured key (or "private" key), meaning that the collection of data constituting the key is not made publicly available and, preferably, is not made available to others except as described herein. A copy of each secured key also exists in a central, secure database system that is also connected to the network. A secured key preferably can be used to encrypt and decrypt messages. Each customer uses an "Internet Consumer kit" containing the software for conducting transactions as described herein. Internet consumer kits preferably are made widely available. For example, the kits may be made available at each participating merchant. Each merchant uses an integrated communications software package that includes a database, a customer interface, a money processor interface, and a virtual HTML store generator. A wide variety of software for implementing the above features, and those features described herein, will be apparent to those skilled in the art based on the present disclosure.

The customer selects products to purchase by accessing a merchant's Web site and clicking on one or more "links" that put the products in a "virtual shopping cart." The customer then clicks a "checkout link" that causes an itemized price list to be downloaded to the customer's computer. Once downloaded, this information is merged with information locally stored on the customer's computer. The customer's computer then adds sales tax information and sends this information along with a shipping address back to the merchant. Credit card information from the customer is sent directly to the money processor; the merchant preferably does not receive the customer's credit card information. The money processor informs the merchant that the transaction is complete.

A. Structure of the System.

The structure of a merchandising system according to the present invention is described in more detail below in connection with FIG. 1. For the sake of clarity, FIG. 1 shows only a single merchant computer system, a single money processor computer system, and a single customer computer system. It is understood that the present invention permits any number of merchant, money processor and customer computer systems, each of which operates as described below.

The merchant, customer and money processor computer systems shown in FIG. 1 (systems 3, 2, and 4, respectively) independently run interrelated software programs and function as a group to permit merchandising according to the present invention. As shown in FIG. 1, each system has an associated secured key. Communications among separate systems preferably are conducted over the Internet.

A master key server system 1 acts as a secure communications router. Master key server 1 communicates with various computer systems over the Internet or other public network system. As shown in FIG. 1, master key server 1 includes a secured key database containing copies of the secured key for each merchant, customer, and money processor. The communication paths between master key server and various other computer systems are shown as path-7, path-9, path-10, and path-13. These paths indicate logical paths; the communications sent along these paths are preferably over the Internet and, as with other Internet communications described herein, the actual physical paths may vary.

Customer computer system 2 initiates communications. Customer system 2 obtains information from the merchant computer system (also referred to as the Merchant's Storefront) 3 over communication path-6. Information generally is sent in the form of HTML pages that are dynamically created by the merchant system. Each time a customer clicks on an item in a store, the information is stored in a logical "shopping cart."

When the customer finally clicks on "go to cashier," a file containing all selected items gets transmitted to the customer. This file is lightly encrypted before transmission, and then sent to the customer for further processing. A password is also transmitted to the customer, preferably as part of the file; the password is used by the customer to encrypt merchant and money processor data packets that are to be sent to the merchant and the money processor systems, respectively. After these data packets are created by the customer, they are combined in a single file, encrypted with the customer's secured key, and sent to master key server 1.

The master key server 1 then decrypts this file, splits it into two separate files (a merchant data packet and a money processor data packet) and ships each packet to its final destination. Master key server 1 has a copy of each customer's secured key in a secured key database and, therefore, possesses the capability to decrypt the data sent to it. Before files are shipped out from the master key server 1, they are encrypted with the secured keys of the recipients. When there are two levels of encryption (i.e., when the data content is separately encrypted before encryption with the secured key), the master key server is blind to the actual data content being sent through it.

Merchant system 3 has a local (storefront) database 17, which stores each customer's order, all inventory items, and pricing information. Merchant system 3 communicates with local database 17 via communications path 16. This database is tightly integrated into the virtual store's software system and the database may be part of the same computer system as the merchant's storefront. The merchant has a direct communications path 8 to the money processor server system 4 and a direct path 6 to the customer 2, which paths preferably are over the Internet. Communication on these paths is performed outside of the knowledge of master key server 1 so that private passwords may be used to create a 2-level encryption system as noted above.

Merchant manager 12 communicates with the merchant's storefront via master key server 1 over path- 13. Merchant manager 12 typically runs on a personal computer and is password protected. This allows the merchant manager to add inventory items and change pricing information. As shown in FIG. 1, the merchant manager 12 has a secured key for communications through the master key server. A copy of this secured key therefore exists in the secured key database of the master key server.

Money processor system 4 preferably communicates directly with a financial institution (e.g., a bank or credit card processor) 5, via path-11. Current methods for conducting such communication include modems running on a private line direct to the bank. In some embodiments, however, the bank is also money processor server 4, thereby eliminating communications path-11. Money processor system 4 receives a one-way communications packet via path-8 from the merchant system 3 giving it the password sent to the customer, which password will later be used to unlock the data packet originating from the customer 2. Communications from the money processor system 4 back to the merchant system 3 are routed through the master key server 1 via path-10.

The customer has an associated local customer database 15 with which it communicates over path 14. This path may simply be a file read or write operation, and the database may be integrated into the customer computer system.

Each logical client of the master key server 1 (i.e., each customer, merchant, and money processor computer system) has its secured key updated following each transmission or reception of data by that client. This creates a moving target; in the unlikely event that a secured key is discovered, it is valid only for a single transaction and from a single customer. There is no way that this knowledge may be applied to other transactions; thus, security is greatly improved. The most viable attack on the security of this system would be to break into the building where the master key server is located and load all the secured keys. This is where the double blind method is useful; as noted above, in some embodiments, information passing through the master key server is encrypted in a form which cannot be decrypted by the master key server, before it is encrypted using the secured key.

B. Communications During Transactions.

Preferred embodiments of merchandising systems according to the present invention use a series of inter-related communications to perform a transaction. The set of basic communications used by a preferred merchandising system is described below.

1. Merchant to Customer.

A customer finds a merchant Web site, clicks on the items that he desires to purchase, and presses the "BUY IT" link on his web browser software. Clicking on "BUY IT" causes a packet of information to be downloaded (FIG. 1-path 6). The name of the file being downloaded has a 3-letter suffix, such as ".ASD", which causes what is commonly known as a "Helper Application" to run and receive this file being downloaded from the Merchant via the Internet. The downloaded file is lightly encrypted (or scrambled) and contains a CRC checking system that validates the contents of this file. Light encryption or scrambling is defined as a process in which all the information necessary to unscramble the message including the key is sent together with the message in one file. The decryption algorithm contained within one customer program is identical to the algorithms in all other customer programs. The information being sent is not sensitive information; it only details what the customer has purchased. The purpose of the light encryption is to reduce the possibility of a bogus file accidentally causing the customer program to respond. Even if someone were to figure out how to create a fake merchant, the file would eventually get thrown out because the master key server will not communicate with a merchant that is not in the master key database.

The downloaded and lightly encrypted file sent by the merchant contains the following information:

(1) The merchant's account number and purchase order number. This number will eventually get passed along to the money processor system 4 by the customer, and allows the money processor (server) system 4 to know which merchant account to credit.

(2) The merchant's order number. This number keeps track of which order is which. This number will eventually get sent back to the system 3 for tracking purposes. This number is also used by the money processor system 4.

(3) An encryption key. This key is used to "keep the master key server 1 honest." Data packets are encrypted using both the customer secured key and the encryption key sent by the merchant. The master key server I removes one level of encryption (i.e., the secured key level) so that it can re-encrypt the packet with the secured key of the recipient, and send it to another location. It does not know how to decrypt the second level. It merely encrypts and sends the data packet "as is" on to the next location. This "double-blind" method of encryption keeps all information that flows through the master key server unrecognizable as an added level of security.

(4) The list of items that the customer selected. This information will eventually turn into a receipt that the customer may print out or save to his hard disk.

(5) A series of equations defining post-processing activities. The merchant is blind to information such as state and local taxes. In order to avoid any need for the customer to enter tax-related information into a form, post processing via a local calculator is performed on the customer's computer. As information eventually flows back to the merchant, the merchant may then account for the sales tax collected by receiving the state and county information from the customer. This makes shopping much less of a hassle by minimizing the amount of information that a customer has to enter into any merchant's order form.

(6) A list of information items that the merchant requires to ship the product to the customer. This list includes shipping address and name. Other options may also be requested, such as EMAIL address, and telephone number. The customer has the option to prevent selected information from being sent to the merchant.

2. Customer to Master Key Server.

After this information is received in the customer's computer, an application program that resides on the customer's computer is launched using as input the contents of the file sent by the merchant. This application performs the following functions:

(1) Decrypts the message being sent by the merchant.

(2) Calculates local and sales taxes if any.

(3) Prompts the user to choose a credit card or ATM card to pay for the items that he selected at the merchant's store (the credit card numbers were previously stored).

(4) Creates two data packets: one to be sent back to the merchant, and the other to be sent to the credit card processing center or bank.

(5) Encrypts these two data packets with the password that was sent to the customer by the merchant.

(6) Combines these two data packets and creates a header detailing where they are to be sent. This header also defines the size of each data packet, the index key which will be used to encrypt the data packet, and the Internet address of where to send this packet. Also included is the name of the file that will be downloaded.

(7) Encrypts the entire information packet with its secured key.

(8) Sends this file to the master key server.

3. Master Key Server to Merchant and Money Processor Systems.

The master key server 1 receives this packet sent by the customer. The file sent to the master key server 1 uses an 8 character index key name to look up the customer's secured key in the master key database. The master key server:

(1) Decrypts the packet sent by the customer using its copy of the customer's secured key, which is stored in the master key database. The index key used to look up the secured key preferably is passed to the master key database by virtue of the physical name of the file which was transmitted. In other words, the file name and index key name are identical.

(2) Reads the header information that tells the master key server where to send the information. The name sent to the processor is a combination of the order number, and the merchant account number (which merchant account number preferably is the merchant's index key). The name of the file sent back to the merchant is the order number.

(3) Separates each data packet and re-encrypts each data packet using the secured key associated with the recipient. The master key server uses a "decryption" algorithm to "encrypt" the data. This helps to further secure the data because the algorithm to encrypt is different from the algorithm to decrypt. Deriving the decryption algorithm from the encryption algorithm is a difficult and painfully slow process at best. This process includes reverse engineering several client programs. The task of deriving the algorithm number from the index key is nearly impossible. In some alternative embodiments, the algorithm number is completely unrelated to the index key and is stored in the master key database.

(4) Sends each data packet to the recipient. One data packet goes to the merchant, the other to the bank or credit card processor.

4. Money Processor To/From Merchant.

Money processor system 4 receives a data packet, but does not know how to decrypt it. It must receive information concerning decryption directly from the merchant. This decryption entails a password string that was sent to the customer. The merchant originally created this password string and tells the customer and the processor what it is without the master key server ever having access to this information. This double blind method keeps the master key server honest.

The merchant receives its data packet which contains an order number, tax information, the total price and the customer's shipping address. At no time is the credit card number exposed to the merchant or any other sensitive information that it has no business seeing. This keeps the credit card information very safe. The merchant will eventually receive a message from the credit card processor which validates the order. The customer can be informed in any conventional manner that all transactions have been completed.

C. Additional Security Measures.

After each use of the master key server, the secured key preferably changes through a process of handshaking. The master key server passes a random string of characters to each client that sends a packet of data. This random string of characters modifies the old secured key, creating a new secured key. Both the client and the master key server update their respective secured keys in the same way after handshaking has completed.

Handshaking is performed as follows:

(1) Master key server sends a data packet containing a string of random numbers. This data packet is encrypted using the old secured key.

(2) Client creates a new secured key while saving the old one based on the random data it received after decryption.

(3) Client sends a message back to the master key server using the "New Secured key". The message reads: OK I got it! This message is preceded by a string of 256 pseudo random numbers generated by using the previous random data it received as a seed. The seed was also previously initialized by the index key and algorithm number. Also part of the header is the "command" which tells the master key server that this is a key update handshake message and not a packet transmission.

(4) Master key server receives this packet, checks the 256 numbers for validity, and returns a message back to the client further validating the new key. This message uses the new secured key.

(5) The client then throws away the old key and uses the new key.

Merchants and money processors change their keys on a scheduled basis. The merchant and processor may also have a block of keys so that it can update them on a rotating basis.

Each client is defined as either a customer, a merchant, or a bank. In the unlikely event that the secured keys get out of sync, a client may request a new key. This is driven by the client who sends a special message to the master key server. This message uses yet another encryption system based on the index key and an algorithm number. The client commands the master key server to discard the old index key, and to issue a new one. This encryption is necessary to prevent someone from throwing away a key that does not belong to him. This action will also cause the customer to lose all of the information contained within his local database including all credit card information. This process helps to remove orphaned index keys from cluttering the database. Also, if the system is not used in a year's time from the last use, the index key is deleted from the database.

The client program is password protected. If the client forgets his password, he will have to reenter all of the information contained within his database. It is not necessary to get a new index key. The initial password generates the initial secured key. After this is done, the password is needed only to secure the local database. The password protection is put in place to prevent the situation where the family computer is stolen, and to prevent children from using the system without parental supervision.

The credit card server is totally automated requiring no human intervention. In the event that something goes wrong, the customer may call the bank or credit card processing center. This information is contained within the final web page displayed by the merchant. That page will either tell the user that the transfer of money was successful or provide a reason for its rejection. Some common problems may be as follows: credit card expiration date has expired; credit line has been exceeded; credit card reported lost or stolen; given name on credit card does not match actual name.

There are also two logical portions to each merchant's merchandising operation. One is the merchant's storefront (also referred to as the merchant system), and the other is the store manager (also referred to as the merchant manager). The store manager communicates with the actual store by using the master key server. The store manager has a special software package that has the ability to command the store to upload or download its current inventory database, change pricing information, or add new items to the database. The store manager may also change the look and feel of the store by uploading new graphics, and logos. This software package is written in such a way as to remove the complexity of creating HTML forms, programming SQL database engines, and other complex activities making the store manager able to do what he does best. This store manager software package is also password protected. This prevents dishonest employees from changing price information without the knowledge of the store manager. In the event that the store manager forgets his password, a system is put in place to extract this password. This is performed using the following procedure:

(1) Store manager calls a mall manager, an entity responsible for verifying the identity of merchants.

(2) Mall manager verifies that the store manager is who he says he is by comparing his application with verbal questions.

(3) The mall manager then provides a temporary password that takes the store manager to a later screen which allows the merchant to enter in a new password. This temporary password is based on the combination of the index key for the store, the index key of the store manager, and a pseudo random number based on a seed created by the secured key; the mall manager does not see the secured key, but only the resulting random number. Built into this temporary password is a self-checking CRC. This temporary password only works one time and only on this one machine.

(4) A screen comes up asking the merchant manager to enter in a new password.

(5) The store manager preferably must then retype the password.

In the event that the secured keys for the merchant manager get out of sync, the manager must download an "emergency repair kit". This repair kit is password protected, where the password must be received verbally over the phone by the mall manager. This repair kit also fixes the combined problem of a forgotten password and an out-of-sync secured key. This uses the same above process except for the fact that the locally stored secured key is used instead of the copy that resides in the master key server. This process of resynchronizing is different from that of a customer, because of security issues. Also, there is no locally stored information other than the secured key and password on the merchant's merchant computer; thus, reentering information is not possible because the database is large and remote.

D. Use of Web-Related Features.

The present invention is particularly useful in connection with the popular Hyper-Text Markup Language ("HTML") used on the World Wide Web, a graphical communications system that runs over the Internet. In HTML, links point to other locations and files on the Internet. A link uses an addressing scheme similar to how mail is delivered by the post office. Domain Name Services have been deployed allowing the user to type in plain text instead of what are known as IP addresses. Currently an IP address contains 4 bytes each separated by the colon character. Below are several examples of IP addresses:

113:46:5:199  51:191:77:192
173:112:255:66  131:7:51:101

This provides roughly 4 billion addresses that may be used. Each of these addresses could potentially have what is known as a domain name. These domain names are registered and distributed on multiple computers and routers. A router is a device that sends information from one server to another. Several examples of Internet addresses interpreted by Domain Name Service are as follows:

http://www.allsoft.disti.com/index.html
http://www.microsoft.com
ftp://ftp.linksys.com
gopher://liberty.uc.wlu.edu/public/

The first series of characters up to and including the "//" defines a communications protocol. This tells the "Internet Web Browsers" how to interpret a data package that will eventually get transmitted. The next section contains the domain name. Domain names end in suffixes such as: net, corn, edu, org, and pri. A domain name may also contain a one or more prefixes such as "www". Each prefix is delimited by a period. The computer that owns that domain name resolves these prefixes to a physical IP address or a directory. Following the domain name is a directory path name the most common being "/index.html" which indicates the official starting home page for that domain.

Another function of the Internet that predates web pages is EMAIL. An EMAIL address uses one or more prefixes such as someone's name, and appends "@" plus the domain name. Several examples are shown below:

gary@foo.com
bill@whitehouse.gov
mark.eel@aol.com

Many "Internet Web Page Browsers" have what are known as "helper apps". A helper application is invoked when a file name containing a file extension consistent with that application. These helper application suffixes are programmable. Some examples follow:

Extension name: Program:
".zip" winzip.exe
".wav" mplayer.exe
".ps" gscript.exe
".doc" msword.exe This invention uses the above concept of a "helper app" in order to launch the customer program that receives the information from the merchant which also sends this information back to the merchant and bank mixed with the customer's personal information.

The program that the customer runs is capable of performing encryption intended for commerce only. The customer may only communicate with the bank and the merchant via the master key server (FIG. 1,1). The algorithm used cannot be easily modified to be used as a stand-alone encryption system. The system is further restricted by not allowing customers to communicate with other customers. The information that gets sent by the customer is nothing more than credit card numbers, shipping address, name and purchase total. This kind of information does not pose a national risk, nor can it facilitate drug trafficking. Thus, there is no reason for any barriers or restrictions concerning the export of this technology.

It is relatively easy to establish a "virtual store" using the present invention. The store manager can remotely change prices, add inventory items, and even change the took of his storefront. This is accomplished using a "store manager" program operating in accordance with the present invention. This program is tightly integrated with the merchant's storefront. Security is maintained because only the computer that has the store manager's secured key can change the storefront. The software is also password protected preventing dishonest employees from changing price information. For smaller shop keepers, it is also possible for the store manager to run his entire business from the virtual store's database keeping shipping logs, inventory, and all other aspects of running a business.

The present invention encompasses all subject-matter within the scope of the following claims. In this regard, it will be appreciated by those skilled in the art that additional embodiments of the present invention beyond those explicitly discussed above may be made without departing from the teachings of the present invention. Such embodiments are intended to be within the scope of the claims.

For example, a single secured key used in connection with the present invention preferably can be used to encrypt and decrypt messages. Based on the present disclosure, however, it will be apparent to those skilled in the art that the present invention permits embodiments in which different keys are used to encrypt and decrypt messages.

Based on the present disclosure, it will also be apparent to those skilled in the art that embodiments of the present invention exist wherein the secured key held by a client is actually different from the "copy" held by the master key server, so long as the master key server and the relevant client can each encrypt and decrypt messages transmitted between them, and each keeps the relevant keys confidential.

For purposes of this disclosure, the terms "include" and "including" mean "include/including without limitation."

I claim:

1. A merchandising system for conducting a transaction over an electronic network, comprising:
   a network;
   a merchant computer system coupled to the network;
   a money processing entity computer system coupled to the network; and
   a customer computer system coupled to the network having hardware and software for sending to the merchant computer system, over the network, a merchant transaction data packet that contains information required by the merchant to process the transaction, and hardware and software for sending to the money processing entity computer system, over the network, a money processor transaction data packet that contains information required by the money processing entity to process the transaction, wherein the money processor transaction data packet includes confidential information that is not included in the merchant transaction data packet.

2. The merchandising system of claim 1, wherein the network is public.

3. The merchandising system of claim 2, wherein the network comprises the Internet.

4. The merchandising system of claim 2, wherein the customer computer system, the merchant computer system, and the money processing entity computer system communicate in encrypted form.

5. A merchandising system for conducting a transaction over an electronic network, comprising:
   a network;
   a merchant computer system coupled to the network;
   a money processing entity computer system coupled to the network; and
   a customer computer system coupled to the network having hardware and software for sending to the merchant computer system, over the network, a merchant transaction data packet that contains information required by the merchant to process the transaction, and hardware and software for sending to the money processing entity computer system, over the network, a money processor transaction data packet that contains information required by the money processing entity to process the transaction, wherein the money processor transaction data packet includes confidential information that is not included in the merchant transaction data packet;
   wherein the network is public;
   wherein the customer computer system, the merchant computer system, and the money processing entity computer system communicate in encrypted form;
   wherein the customer computer system, the merchant computer system, and the money processing entity computer system communicate through a master key server, wherein the master key server performs decryption services.

6. A merchandising system for conducting a transaction over an electronic network, comprising:
   a network;
   a merchant computer system coupled to the network;
   a money processing entity computer system coupled to the network;
   a customer computer system coupled to the network having hardware and software for sending to the merchant computer system, over the network, a merchant transaction data packet that contains information required by the merchant to process the transaction, and hardware and software for sending to the money processing entity computer system, over the network, a money processor transaction data packet that contains information required by the money processing entity to process the transaction, wherein the money processor transaction data packet includes confidential information that is not included in the merchant transaction data packet; and
   a customer database local to the customer computer system and customer data stored in the customer database.

7. A merchandising system for conducting a transaction over an electronic network, comprising:
   a network;
   a merchant computer system coupled to the network;
   a money processing entity computer system coupled to the network; and a customer computer system coupled to the network having hardware and software for sending to the merchant computer system, over the network, a merchant transaction data packet that contains information required by the merchant to process the transaction, and hardware and software for sending to the money processing entity computer system, over the network, a money processor transaction data packet that contains information required by the money processing entity to process the transaction, wherein the money processor transaction data packet includes confidential information that is not included in the merchant transaction data packet: and
   a master key server which stores secured and index keys, wherein the master key server translates information sent in encrypted form by the customer computer system, the merchant computer system, and the money processing entity computer system.

8. A merchandising system for conducting a transaction over an electronic network, comprising:
   a network;
   a merchant computer system coupled to the network;
   a money processing entity computer system coupled to the network; and
   a customer computer system coupled to the network having hardware and software for sending to the merchant computer system, over the network, a merchant transaction data packet that contains information required by the merchant to process the transaction, and hardware and software for sending to the money processing entity computer system, over the network, a money processor transaction data packet that contains information required by the money processing entity to process the transaction, wherein the money processor transaction data packet includes confidential information that is not included in the merchant transaction data packet;
   wherein the customer computer system, the merchant computer system, and the money processing entity computer system communicate with each other over a wide area network.

9. A merchandising system for conducting a transaction over an electronic network, comprising:
   a network;
   a merchant computer system coupled to the network;
   a money processing entity computer system coupled to the network; and a customer computer system coupled to the network having hardware and software for sending to the merchant computer system, over the network, a merchant transaction data packet that contains information required by the merchant to process the transaction, and hardware and software for sending to the money processing entity computer system, over the network, a money processor transaction data packet that contains information required by the money processing entity to process the transaction, wherein the money processor transaction data packet includes confidential information that is not included in the merchant transaction data packet:
   wherein the customer computer system receives merchant information from the merchant computer system, combines the merchant information with selected locally stored personal and financial information to create two separate transaction data packets, one of the transaction data packets being sent to the merchant computer system, and the other of the transaction data packets being sent to the money processing entity computer system.

10. The merchandising system described in claim 9, wherein the stored personal and financial information comprises confidential customer information, and the customer computer system, in response to a command from a user of the customer computer system, sends a selected amount of information to the money processing entity computer system.

11. The merchandising system of claim 9, wherein the transaction data packets are sent through a master key server, and the packets are first encrypted using a data string and subsequently encrypted using a secured key available to the master key server.

12. The merchandising system of claim 11, where the customer computer system receives the data string from the merchant computer system.

13. An electronic communications system, comprising:
a central server system having a plurality of secured keys;
a plurality of client computer systems, each of the client computer systems being associated with one of said secured keys, wherein three or more client computer systems communicate with each other through the central server system, and the central server system decrypts information sent by a first client computer system using the secured key associated with the first client computer system and encrypts a first data packet with a secured key associated with a second client computer system and encrypts a second data packet with a secured key associated with a third client computer system, wherein the first data packet includes information not included in the second data packet.

* * * * *